United States Patent
Mehra et al.

(10) Patent No.: US 12,512,963 B2
(45) Date of Patent: Dec. 30, 2025

(54) SYSTEM AND METHOD FOR SECURELY SYNCHRONIZING AND INTEGRATING DATA STORED IN DATABASES ASSOCIATED WITH MULTIPLE ENTITIES

(71) Applicant: Bank of America Corporation, Charlotte, NC (US)

(72) Inventors: Naman Mehra, Charlotte, NC (US); Aeric John Solow, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 128 days.

(21) Appl. No.: 18/517,776

(22) Filed: Nov. 22, 2023

(65) Prior Publication Data

US 2025/0167977 A1    May 22, 2025

(51) Int. Cl.
*G06N 5/022* (2023.01)
*H04L 9/00* (2022.01)

(52) U.S. Cl.
CPC ............. *H04L 9/008* (2013.01); *G06N 5/022* (2013.01)

(58) Field of Classification Search
CPC ................................ H04L 9/008; G06N 5/022
See application file for complete search history.

(56) References Cited

U.S. PATENT DOCUMENTS

| | | |
|---|---|---|
| 9,762,553 B2 | 9/2017 | Ford et al. |
| 10,033,702 B2 | 7/2018 | Ford |
| 10,984,016 B2 | 4/2021 | Gunther |
| 10,992,649 B2 | 4/2021 | Lobban et al. |
| 11,277,257 B2 * | 3/2022 | Kim .................. H04L 9/008 |
| 11,328,556 B2 | 5/2022 | Marantelli |
| 11,354,747 B2 | 6/2022 | Magdelinic |
| 11,544,782 B2 | 1/2023 | Cella |
| 11,586,177 B2 | 2/2023 | Cella et al. |
| 11,741,553 B2 | 8/2023 | Cella |
| 11,809,310 B2 * | 11/2023 | Sloane ............... G06F 11/3684 |
| 2018/0322597 A1 | 11/2018 | Sher |
| 2019/0087893 A1 | 3/2019 | Pellew |
| 2020/0226677 A1 | 7/2020 | Dhawan et al. |
| 2020/0320206 A1 * | 10/2020 | Cammarota ........... G06F 21/57 |
| 2021/0201328 A1 | 7/2021 | Gunther |
| 2021/0248514 A1 | 8/2021 | Cella et al. |
| 2022/0122062 A1 | 4/2022 | Mayblum et al. |

(Continued)

*Primary Examiner* — Etienne P Leroux

(57) ABSTRACT

A method includes accessing the first user data set and the second user data set. The second user data set includes a homomorphically-encrypted data set. The method includes executing a predictive model trained to generate a homomorphically-encrypted recommendation of an identified interaction for a user based at least in part upon the first user data set and the homomorphically-encrypted data set. The user is associated with at least one of the first entity or the second entity. The method further includes transmitting the homomorphically-encrypted recommendation of the identified interaction for the user to a computing system associated with the second database and the second entity, receiving, from the computing system associated with the second database and the second entity, a decrypted recommendation of the identified interaction for the user, and transmitting the decrypted recommendation to a computing system associated with the user.

20 Claims, 5 Drawing Sheets

(56) References Cited

U.S. PATENT DOCUMENTS

| | | |
|---|---|---|
| 2022/0172207 A1 | 6/2022 | Cella et al. |
| 2022/0198562 A1 | 6/2022 | Cella et al. |
| 2022/0366494 A1 | 11/2022 | Cella et al. |
| 2024/0403476 A1* | 12/2024 | Boemer .............. G06F 21/6227 |

* cited by examiner

SYSTEM AND METHOD FOR SECURELY SYNCHRONIZING AND INTEGRATING DATA STORED IN DATABASES ASSOCIATED WITH MULTIPLE ENTITIES

TECHNICAL FIELD

The present disclosure relates generally to data stored in databases, and, more specifically, to a system and method for securely synchronizing and integrating data stored in databases associated with multiple entities.

BACKGROUND

Certain web-based environments may include data stored across any number of databases and associated with any number of entities. For example, the data may include various user data that may be stored to databases associated with respective entities, and that user data may be accessed by any number of centralized or decentralized servers for servicing applications associated with users.

SUMMARY

The system and methods implemented by the system as disclosed in the present disclosure provide technical solutions to the technical problems discussed above by providing systems and methods for securely synchronizing and integrating data stored in databases associated with multiple entities. The disclosed system and methods provide several practical applications and technical advantages.

The present embodiments are directed to systems and methods for securely synchronizing and integrating data stored in databases associated with multiple entities. In certain embodiments, one or more processors of a computing system may access a first user data set and a second user data set. In one embodiment, the second user data set may include a homomorphically-encrypted data set. In certain embodiments, the first user data set may be sourced from a first database associated with a first entity and the second user data set may be sourced from a second database associated with a second entity. For example, in one embodiment, the second entity may be separate from the first entity. In certain embodiments, the first entity may include a first user profile configured to facilitate user interactions between only the user and the first entity. In certain embodiments, the second entity may include a second user profile configured to facilitate user interactions between the user and a number of other users associated with the second entity.

In certain embodiments, the one or more processors may execute a predictive model trained to generate a homomorphically-encrypted recommendation of an identified interaction for a user based at least in part upon the first user data set and the homomorphically-encrypted data set. In one embodiment, the user may be associated with at least one of the first entity or the second entity. In one embodiment, the predictive model may include one or more of a univariate logistic regression model, a multivariate logistic regression model, a random forest model, a Naïve Bayes model, a gradient boosting model, a neural network (NN) model, or a statistical model.

In certain embodiments, the one or more processors may then transmit the homomorphically-encrypted recommendation of the identified interaction for the user to a computing system associated with the second database and the second entity. In certain embodiments, the one or more processors may then receive, from the computing system associated with the second database and the second entity, a decrypted recommendation of the identified interaction for the user. In certain embodiments, the one or more processors may then transmit the decrypted recommendation of the identified interaction for the user to a computing system associated with the user.

In certain embodiments, the one or more processors may, prior to transmitting the decrypted recommendation of the identified interaction for the user to the computing system associated with the user, retrieve, from the first database associated with the first entity, contextual data associated with the first user data set, and then update the decrypted recommendation of the identified interaction for the user based on the retrieved contextual data associated with the first user data set. In certain embodiments, the one or more processors may, prior to accessing the second user data set, generate and provide an application programming interface (API) request to the second database associated with the second entity for the second user data, and receive, from the second database associated with the second entity, the second user data set in response to the API request. For example, in one embodiment, the second user data set may be received as the homomorphically-encrypted data set.

In certain embodiments, the one or more processors may access a third user data set sourced from a third database associated with a third entity. For example, in one embodiment, the third user data set may include a second homomorphically-encrypted data set. In one embodiment, the third entity may be separate from the first entity and the second entity. In certain embodiments, the one or more processors may execute the predictive model to generate a second homomorphically-encrypted recommendation of an identified interaction for the user based at least in part upon the first user data set and the second homomorphically-encrypted data set.

In certain embodiments, the one or more processors may then transmit the second homomorphically-encrypted recommendation of the identified interaction for the user to a computing system associated with the third database and the third entity. In certain embodiments, the one or more processors may receive, from the computing system associated with the third database and the third entity, a second decrypted recommendation of the identified interaction for the user, and transmit the second decrypted recommendation of the identified interaction for the user to the computing system associated with the user.

In certain embodiments, the one or more processors may, prior to transmitting the second decrypted recommendation of the identified interaction for the user to the computing system associated with the user, retrieve, from the first database associated with the first entity, contextual data associated with the first user data set, and update the second decrypted recommendation of the identified interaction for the user based on the retrieved contextual data associated with the first user data set. In certain embodiments, the user may be associated with only the second entity. In certain embodiments, the one or more processors may generate and provide an application programming interface (API) request to the second database associated with the second entity for the second user data, and then receive, from the second database associated with the second entity, the second user data set in response to the API request. For example, in one embodiment, the second user data set may be received as the homomorphically-encrypted data set.

In certain embodiments, the one or more processors may execute the predictive model to generate a second homomorphically-encrypted recommendation of an identified interaction for the user based at least in part upon the homomorphically encrypted data set. In certain embodiments, the one or more processors may transmit the second homomorphically-encrypted recommendation of the identified interaction for the user and a set of instructions to the computing system associated with the second database and the second entity. For example, in one embodiment, the set of instructions may include instructions to cause the computing system associated with the second database and the second entity to decrypt the second homomorphically-encrypted recommendation of the identified interaction for the user to generate a second decrypted recommendation of the identified interaction for the user, and then to transmit the second decrypted recommendation of the identified interaction for the user to the computing system associated with the user.

The disclosed system and method provide the additional practical application of improving interoperability and security of various web-based systems by utilizing homomorphic encryption to securely synchronize and integrate user data stored in databases associated with multiple entities (e.g., a first entity may include an entity at which the user conducts interactions; a second entity may include a web-based environment in which the user services other users). In certain embodiments, the server of the first entity may access first user data associated with the user stored in an internal database of the first entity and request via an application programming interface (API) call to a database associated the second entity for second user data. In one embodiment, the first user data may include, for example, user interactions data associated with the user. In one embodiment, the second user data may include, for example, any of various user services data.

In certain embodiments, the server of the first entity may receive back homomorphically encrypted values corresponding to the second user data, and then input the first user data and the homomorphically-encrypted values into a predictive model to generate a quantitative result, which is generated in homomorphically-encrypted form. In certain embodiments, the server of the first entity may then provide the homomorphically-encrypted quantitative result to a server of the second entity for decrypting and then receive back the decrypted quantitative result. In certain embodiments, the server of the first entity may further contextualize the decrypted quantitative result and provide the contextualized decrypted quantitative result to the user.

Thus, in accordance with the presently disclosed embodiments, the one or more processors may securely synchronize and integrate data stored in databases associated with multiple entities. In this way, the present embodiments may improve security of web-based services, improve the processing speed of the one or more processors, and reduce database storage usage by executing one or more predictive models on homomorphically-encrypted and generating quantitative result for a user in homomorphically-encrypted form, and thereby reducing the number of calls and storage to the database and the potential redundant processing of siloed data between the data stored in databases associated with multiple entities.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
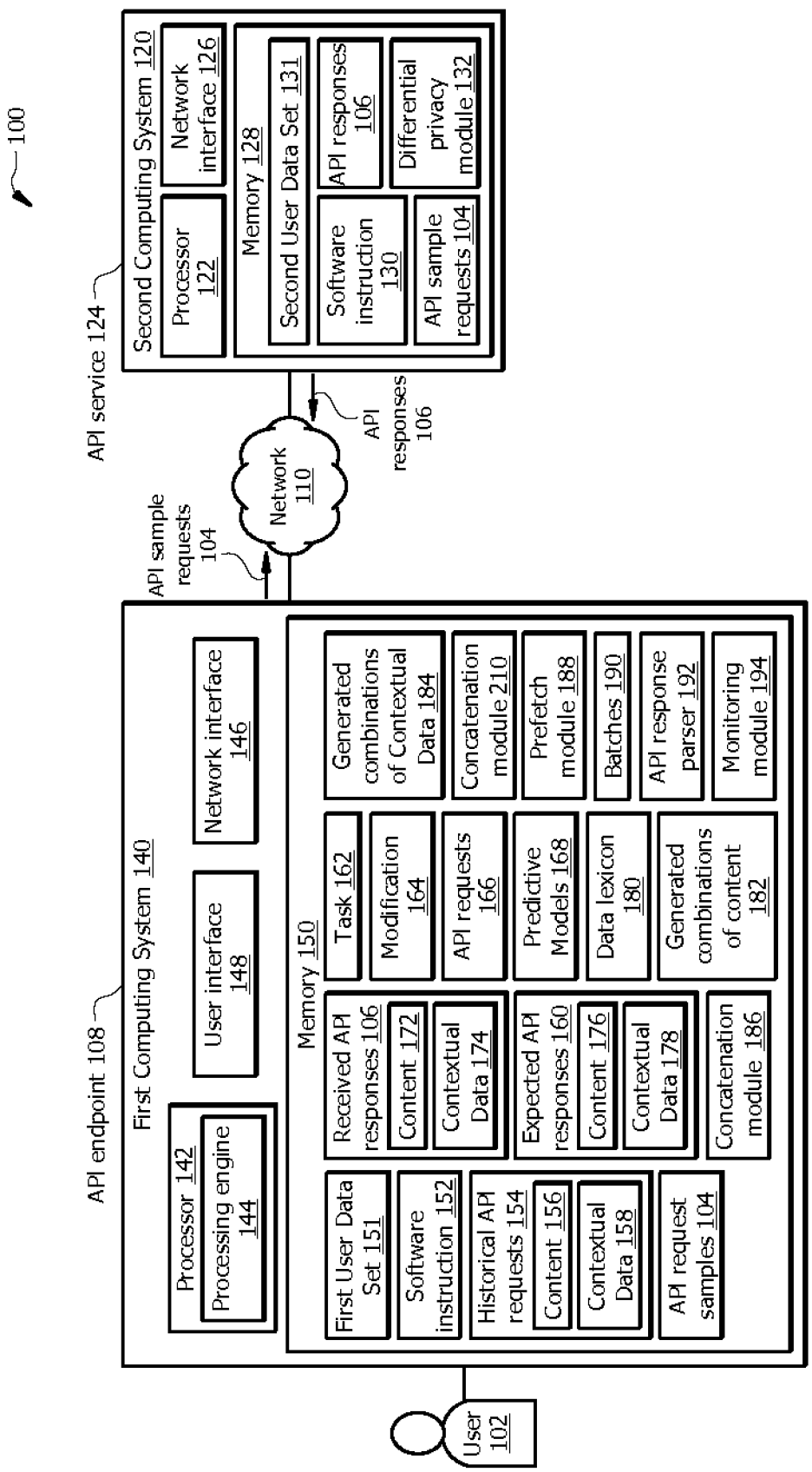
FIG. 1 is a block diagram of a system of a server and host computing system and network, in accordance with certain aspects of the present disclosure.

FIG. 1 is a block diagram of a computing system and network 100 that is configured to detect modifications 164 made to API services 124 and/or API responses 106 and implement the detected modifications 164 to future API requests 166. In one embodiment, computing system and network 100 may include a first computing system 140. In some embodiments, the computing system and network 100 further may include a network 110 and a second computing system 120. The network 110 enables communications among components of the computing system and network 100. In other embodiments, the computing system and network 100 may not have all of the components listed and/or may have other elements instead of, or in addition to, those listed above.

In certain embodiments, the first computing system 140 may include a processor 142 in signal communication with a memory 150. The memory 150 stores software instructions 152 that when executed by the processor 142, cause the processor 142 to perform one or more functions described herein. For example, when the software instructions 152 are executed, the processor 142 executes a processing engine 144 to: 1) generate a plurality of API sample requests 104; 2) send the plurality of API sample requests 104 to the second computing system 120; 3) receive a plurality of API responses 106 from the second computing system 120; 4) evaluate whether there are any changes or modifications 164 made to the API services 124 and/or API responses 106 provided by the second computing system 120; and 5) implement the detected modifications 164 to future API requests 166. The computing system and network 100 may be configured as shown, or in any other configuration. In accordance with the presently disclosed embodiments, the first computing system 140 may be suitable for securely synchronizing and integrating data stored in databases associated with the first computing system 140, the second computing system 120, or both the first computing system 140 and the second computing system 120. For example, in accordance with the presently disclosed embodiments, the first computing system 140 may be associated with a first entity, which and may be separate from a second entity to which the second computing system 120 may be associated.

System Components

Network

In certain embodiments, the network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Second Computing System

In certain embodiments, the second computing system 120 is generally a computing device that is configured to process data and communicate with computing devices (e.g., the first computing system 140), databases, systems, etc., via the network 110 and may be associated with a second entity separate from the first entity in accordance with the presently disclosed embodiments. The second computing system 120 is generally configured to generate API responses 106 in response to receiving the API request samples 104 and/or API requests 166. In certain embodiments, the second computing system 120 may include a processor 122 in signal communication with a network interface 126 and a memory 128. Memory 128 stores software instructions 130 that when executed by the processor 122, cause the second computing system 120 to perform one or more functions described herein. For example, when the software instructions 130 are executed, the second computing system 120 generates API responses 106 in response to receiving the API sample requests 104. The second computing system 120 may be configured as shown, or in any other configuration.

In certain embodiments, the processor 122 may include one or more processors operably coupled to the memory 128. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the network interface 126 and memory 128. The one or more processors are configured to process data and may be implemented in hardware or software.

For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 130 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

The network interface 126 is configured to enable wired and/or wireless communications (e.g., via the network 110). The network interface 126 is configured to communicate data between the second computing system 120 and other network devices, systems, or domain(s). For example, the network interface 126 may comprise a WIFI interface, a local area network (LAN) interface, a wide area network (WAN) interface, a modem, a switch, or a router. The processor 122 is configured to send and receive data using the network interface 126. The network interface 126 may be configured to use any suitable type of communication protocol.

The memory 128 may be volatile or non-volatile and may comprise a read-only memory (ROM), random-access memory (RAM), ternary content-addressable memory (TCAM), dynamic random-access memory (DRAM), and static random-access memory (SRAM), or other non-transitory computer-readable medium. Memory 128 may be implemented using one or more disks, tape drives, solid-state drives, and/or the like. Memory 128 is operable to store the software instructions 130, API sample requests 104, API responses 106, differential privacy module 132, and/or any other data or instructions. The software instructions 130 may comprise any suitable set of instructions, logic, rules, or code operable to execute the processor 122.

In certain embodiments, the memory 128 may also store a second user data set 131 that may be associated the second entity to which the second computing system 120 is associated. For example, in some embodiments, the second entity may include a second user profile configured to facilitate user interactions between the user 102 and a number of other users associated with the second entity, and thus the second user data set 131 may include any data associated with the user 102 and servicing and facilitating user interactions between the user 102 and a number of other users associated with the second entity and the second computing system 120.

First Computing System

In certain embodiments, the first computing system 140 is generally any computing device that is configured to process data and communicate with computing devices (e.g., second computing system 120), databases, systems, etc., via the network 110. The first computing system 140 is generally configured to oversee operations of the processing engine 144. The first computing system 140 is associated with an API endpoint 108 where API request samples 104 are originated. In certain embodiments, the first computing system 140 may include the processor 142 in signal communication with a network interface 146, a user interface 148, and memory 150. The first computing system 140 may be configured as shown, or in any other configuration.

The processor 142 may include one or more processors operably coupled to the memory 150. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 142 may be a programmable logic device, a microcontroller, a microprocessor, or any suitable combination of the preceding. The processor 142 is communicatively coupled to and in signal communication with the network interface 146, user interface 148, and memory 150. The one or more processors are configured to process data and may be implemented in hardware or software.

For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 152 to implement the functions disclosed herein, such as some or all of those described with respect to FIGS. 1-5. In some embodiments, the function described herein is implemented using logic units, FPGAs, ASICs, DSPs, or any other suitable hardware or electronic circuitry.

The network interface 146 is configured to enable wired and/or wireless communications (e.g., via the network 110). The network interface 146 is configured to communicate data between the first computing system 140 and other network devices, systems, or domain(s). For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol.

The memory 150 may be volatile or non-volatile and may comprise a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 150 is operable to store the software instructions 152, historical API requests 154, API request samples 104, concatenation module 186, prefetch module 188, received PAI responses 106, expected API responses 160, generated combinations of content 182, generated combination of contextual data 184, API requests 166, predictive models 168, task 162, modifications 164, data lexicon 180, batches 190, API response parser 192, monitoring module 194, and/or any other data or instructions. The software instructions 152 may comprise any suitable set of instructions, logic, rules, or code operable to execute the processor 142.

In certain embodiments, the memory 150 may also store a first user data set 151 that may be associated the first entity to which the first computing system 140 is associated. For example, in some embodiments, the first entity may include a first user profile configured to facilitate user interactions between only the user 102 and the first entity, and thus the first user data set 151 may include any data associated with the user 102 and servicing and facilitating user interactions between the user 102 and the first entity and the first computing system 140.

In an example scenario, assume that a user 102 (e.g., a developer) wants to invoke an API service 124 provided by the second computing system 120. In some examples, the API service 124 may include generating a user account number for a particular client of an organization associated with the first computing system 140, open a new user profile for a particular client, among other API services 124. The user 102, from the first computing system 140, may send an API request 166 to the second computing system 120, where the API request 166 indicates to provide the API service 124. In the example of generating a user account number, the user 102 may send an API request 166 that indicates to generate a user account number.

The second computing system 120 processes the API request 166 and generates an API response 106 to the API request 166. The API response 106 may include the API service 124. In the example where the API request 166 indicates to generate a user account number, the API response 106 may include the generated user account number.

In some cases, the second computing system 120 may have modified or updated the data format associated with the content and/or contextual data associated with the API service 124 and/or the API responses 106. For example, assume that the second computing system 120 has been using a particular data format for the content and/or contextual data for providing the API service 124, thus first computing system 140 has been receiving API responses 106 with the particular data format associated with the content and/or contextual data. In the example of generating a user account number as an API sample request 104, the first computing system 140 may have been receiving account numbers with 10-digits according to historical API responses 106 that include 10-digits account numbers. Thus, it is expected that the API response 106 to include a 10-digit account number.

However, the process of generating a user account number may have been modified in the second computing system 120 such that 12-digit account numbers are generated from now on in response to receiving API sample requests 104 to generate an account number. In such cases, the received API response 106 may not correspond (or match) the expected or historical API responses 106. The server 14 may not be aware of such changes in the API responses 106. In some cases, this may lead to not receiving an API response 106 due to incompatibility between an API request 104 and requirements of the API service 124 or receiving an error message that indicates the API response 106 is not compatible with the requirements of the API service 124.

Thus, the disclosed computing system and network 100 is configured to detect such changes or modifications 164 between the received API responses 106 and counterpart expected API responses 160. The disclosed computing system and network 100 is configured to detect any change or modification 164 made to the API responses 106, where the API responses 106 may be associated with any number of API services 124. In response to detecting any modification 164 made to the API responses 106, the disclosed computing system and network 100 is configured to implement the detected modifications 164 to future API requests 166 such that the future API requests 166 are modified according to the modifications 164 made to the process of providing their corresponding API services 124.

Processing Engine

Processing engine 144 may be implemented by the processor 142 executing the software instructions 152, and is generally configured to: 1) generate a plurality of API sample requests 104; 2) send the plurality of API sample requests 104 to the second computing system 120; 3) receive a plurality of API responses 106 from the second computing system 120; 4) evaluate whether there is any changes or modifications 164 made to the API services 124 and/or API responses 106 provided by the second computing system 120; and 5) implement the detected modifications 164 to future API requests 166.

The processing engine 144 accesses historical API requests 154. The processing engine 144 generates one or more API request samples 104 based on content 156 and contextual data 158 associated with the historical API requests 154. The processing engine 144 sends the API request samples 104 to the second computing system 120. The second computing system 120 generates API responses 106 to the received API request samples 104. The second computing system 120 sends the API responses 106 to the first computing system 140.

The processing engine 144 parses the API responses 106 and detects content 172 and contextual data 174 associated with the API responses 106. The processing engine 144 compares each received API response 106 with a counterpart expected API response 160, where each received API response 106 and the counterpart expected API response 160 is associated with the same API request sample 104 and/or task 162, such as generating a user account number.

The processing engine 144 determines whether a received API response 106 corresponds with its counterpart expected API response 160. If the processing engine 144 determines that the received API response 106 does not correspond with the counterpart expected API response 160, the processing engine 144 identifies the difference between the received API response 106 and the counterpart expected API response 160. In other words, the processing engine 144 identifies an modification 164 made to the received API response 106, where the modification 164 is made to the received API response 106 by the second computing system 120. In response, the processing engine 144 may update future API requests 166 associated with the particular task 162 according to the modification 164 made to the received API response 106.

Generating Combinations of Content and Contextual Data

The operational flow may begin at an adversarial training generation step where the processing engine 144 accesses the historical API requests 154, e.g., stored in the memory 150 (see FIG. 1).

Each historical API request 154 may include content 156 and contextual data 158. For example, the content 156 associated with a historical API request 154 may include the data that is requested in the historical API request 154. In an example historical API request 154 that requests to generate an user account number for a user, the content 156 may include a name, a unique identifier number, phone number, address, user account number, and/or the like. The contextual data 158 associated with a historical API request 154 may include one or more a header, a trailer, an URL, a data format associated with the content 156, and/or the like.

The processing engine 144 identifies the content 156 and the contextual data 158 associated with the historical API requests 154. The processing engine 144 uses this information to generate the API sample requests 104. One reason for generating API request samples 104 is to generate different combinations or different possibilities of content 182 and contextual data 184. Each combination of content 182 and contextual data 184 corresponds to one API request sample 104. In this manner, the processing engine 144 is able to detect any modification 164 made to any aspect of the process of generating API responses 106 compared to expected API responses 160.

To generate API sample requests 104, the processing engine 144 may generate combinations of content 182 and combinations of contextual data 184. In this process, the processing engine 144 may implement one or more predictive models 168, such as one or more of a univariate logistic regression model, a multivariate logistic regression model, a random forest model, a Naïve Bayes model, a gradient boosting model, a neural network (NN) model, a statistical model, or other similar predictive models. In one embodiment, the processing engine 144 may implement a random data generator for generating combinations of content 182 and combinations of contextual data 184. In this process, the processing engine 144 may vary the content 156 and the contextual data 158 among one or more API sample requests 104.

In the example of an API sample request 104 for generating a user account number for a user, to generate the combinations of content 182, the processing engine 144 may vary different data fields of the content 156, such as names, addresses, phone numbers, use account numbers, number of digits used in the user account numbers, etc. associated with the historical API requests 154. In the example of an API sample request 104 for generating a user account number for a user, to generate the combinations of contextual data 184, the processing engine 144 may vary different data fields of the contextual data 158, such as headers, trailers, URLs, data formats, etc. associated with the historical API requests 154.

In some cases, a data field in content 182 and/or in contextual data 158 may not be generated synthetically and/or randomly. For example, zip codes associated with addresses (in content 156) may be predefined and not generated synthetically and/or randomly. In another example, names of cities associated with addresses (in content 156) may be predefined and not generated synthetically and/or randomly. In another example, the data format in contextual data 158 may be predefined and not generated synthetically and/or randomly. In such cases, the processing engine 144 may search in the data lexicon 180 that includes data that is predefined and/or not generated synthetically and/or randomly. The processing engine 144 may fetch such data from the data lexicon 180 and use it in the various combinations of content 182 and various combinations of contextual data 184.

Generating API Sample Requests

At the execution operation, the processing engine 144 feeds the generated combinations of content 182 and combinations of contextual data 184 to the concatenation module 186.

The concatenation module 186 may be implemented by the processor 142 executing the software instructions 152, and is generally configured to generate the API request samples 104. In this process, the concatenation module 186 may concatenate each generated content 182 with each generated contextual data 184. Each combination of generated content 182 with a generated contextual data 184 may represent one of the API request samples 104. The concatenation module 186 may feed the API request samples 104 to the prefetch module 188.

The prefetch module 188 may be implemented by the processor 142 executing the software instructions 152, and is generally configured to place the API request samples 104 in batches 190. Each batch 190 may include fifty, one-hundred, or any other number of API request samples 104. API request samples 104 in each batch 190 may be associated with a particular API service 124, e.g., generating user account numbers, etc.

The prefetch module 188 may determine whether the API sample requests 104 are compatible with the API services 124 of the destination second computing system 120, so that no error message is expected to be received from the second computing system 120. If the prefetch module 188 determines that the API sample requests 104 (in a first batch 190) are valid and compatible with the desired API service 124, the prefetch module 188 communicates the API sample requests 104 (in a first batch 190) to the second computing system 120.

In one embodiment, while the second computing system 120 is processing the API sample requests 104 (in the first batch 190), the prefetch module 188 may prefetch and prepare the next batch 190 of API sample requests 104 to send to the second computing system 120. The prefetch module 188 may continue this process for the next batches 190.

Generating API Responses

The second computing system 120 receives the API sample requests 104 at the differential privacy module 132. The differential privacy module 132 may be implemented by the processor 122 executing the software instructions 130, and is generally configured to determine whether each of the API sample requests 104 is valid.

In one embodiment, the differential privacy module 132 may determine whether an API sample request 104 is valid by determining whether it has originated from a pre-authenticated endpoint. If the differential privacy module 132 determines that an API sample request 104 is valid, it sends the API sample request 104 to the processor 122 for processing. Otherwise, in one embodiment, the differential privacy module 132 may not forward the API sample request 104 to the processor 122. In another embodiment, the differential privacy module 132 may return an error message to an originator of the invalid API sample request 104. Thus, if the API sample request 104 is determined to be invalid, the second computing system 120 may not generate an API response for it.

In this manner, the computing system and network 100 of FIG. 1 may be integrated into a practical application of improving information security and data loss prevention. For example, a bad actor may attempt to gain unauthorized access to the second computing system 120 by sending an API request 104. By detecting that the API sample request 104 is invalid, data stored in the second computing system 120 may be kept secure from unauthorized access.

The processor 122 receives the validated API sample requests 104 and process them. The processor 122 generates an API response 106 for each validated API sample request 104. For example, if the API sample request 104 includes a request to generate a user account number, the API response 106 to this API sample request 104 includes the generated user account number. The processor 122 communicates the API responses 106 to the differential privacy module 132.

Receiving API Responses

The differential privacy module 132 communicates the API responses 106 to the prefetch module 188. The prefetch module 188 may be implemented by the processor 142 executing the software instruction 152, and is generally configured to parse each API response 106. In one embodiment, the prefetch module 188 implemented a text parsing algorithm, such as natural language processing. In one embodiment, the prefetch module 188 may implement object-oriented programming and treat each data field in the API responses 106 as an object. The prefetch module 188 may include a content parser and a contextual data parser. The content parser may parse the contents 172 of the API responses 106. The contextual data parser may parse the contextual data 174 of the API responses 106. The prefetch module 188 forwards the content 172 and contextual data 174 to the monitoring module 194.

Figure 2:
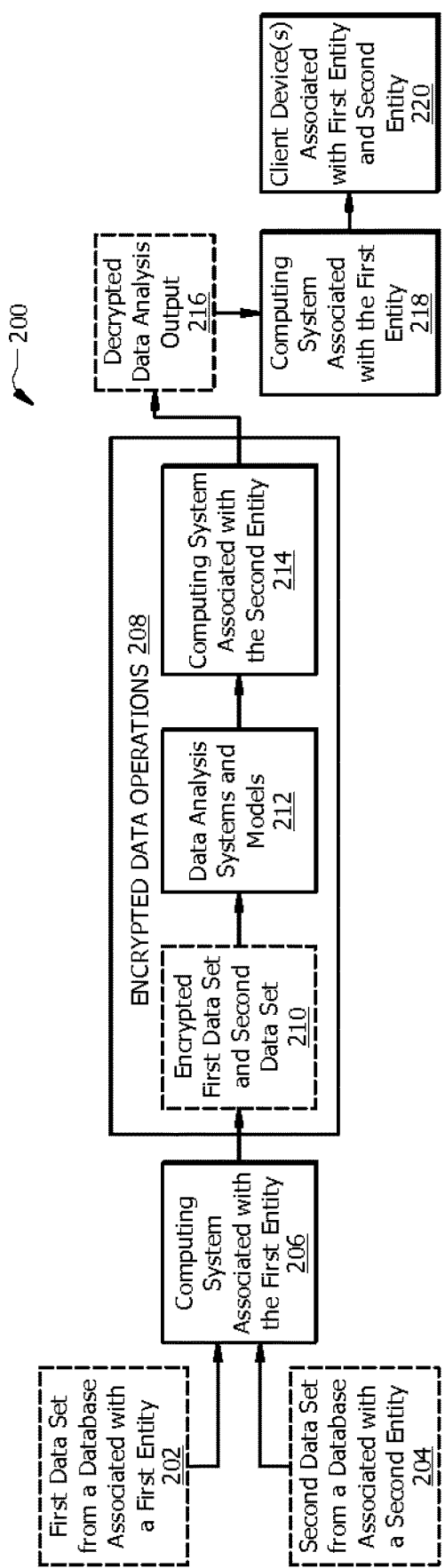
FIG. 2 illustrates a first embodiment of a workflow diagram for securely synchronizing and integrating data stored in databases associated with multiple entities, in accordance with certain aspects of the present disclosure.

Synchronizing and Integrating Data Stored in Databases Associated with Multiple Entities FIG. 2 illustrates a first embodiment of a workflow diagram 200 for securely synchronizing and integrating data stored in databases associated with multiple entities, in accordance with one or more embodiments of the present disclosure. It should be appreciated that the workflow diagram 200 illustrates an embodiment in which the user 102 is associated with both a first entity (e.g., the first entity is associated with the first computing system 140) and a second entity (e.g., the second entity is associated with the second computing system 120). In certain embodiments, as depicted by FIG. 2, the workflow diagram 200 may begin with a computing system 206 associated with a first entity accessing a first user data set 202, which may be sourced from a first database associated with the first entity, and further accessing a second user data set 204, which may be sourced from a second database associated with a second entity.

For example, in certain embodiments, the computing system 206 associated with the first entity may, prior to accessing the second user data set 204, generate and provide an application programming interface (API) request to the second database associated with the second entity for the second user data set 204, and receive, from the second database associated with the second entity, the second user data set 204 in response to the API request. In one embodiment, the second user data set 204 may be received by the computing system 206 associated with the first entity as a homomorphically-encrypted data set.

For example, in one embodiment, the second entity may be separate from the first entity. In certain embodiments, the first entity may include, for example, a web-based service including a user profile for the user 102 and utilized to service and facilitate various user interactions between only the user 102 and the first entity. In certain embodiments, the second entity may include, for example, a web-based service including a second user profile for the user 102 and utilized to service and facilitate user interactions between the user and a number of other users associated with the second entity.

In certain embodiments, as further depicted by FIG. 2, the workflow diagram 200 may continue with the computing system 206 associated with the first entity generating a homomorphically-encrypted data set 210 based on the first user data set 202 and the second user data set 204. In one embodiment, the computing system 206 associated with the first entity may generate the homomorphically-encrypted data set 210 and perform one or more operations utilizing the homomorphically-encrypted data set 210. That is, although illustrated as separate systems, in one embodiment, the computing system 206 associated with the first entity may include an encrypted data operations system 208 integrated as part of the computing system 206 associated with the first entity or as a peripheral system associated with the computing system 206 associated with the first entity.

In another embodiment, the computing system 206 associated with the first entity may generate and provide the homomorphically-encrypted data set 210 to the encrypted data operations system 208, which may be at least partially separate from the computing system 206 associated with the first entity and a computing system 214 associated with the second entity. In certain embodiments, the encrypted data operations system 208 may include one or more servers (e.g., including processors configured to process and operate on any homomorphically-encrypted data) that may be predetermined by the first entity and the second entity to operate on the homomorphically-encrypted data set 210.

In certain embodiments, as further depicted by FIG. 2, the workflow diagram 200 may continue with the encrypted data operations system 208 inputting the homomorphically-encrypted data set 210 into one or more data analysis systems and models 212. For example, in certain embodiments, the one or more data analysis systems and models 212 may include any of various predictive models including, for example, one or more of a univariate logistic regression model, a multivariate logistic regression model, a random forest model, a Naïve Bayes model, a gradient boosting model, a neural network (NN) model, a statistical model, or other predictive model that may be trained to generate as an output a homomorphically-encrypted recommendation of an identified interaction for the user 102 based on the homomorphically-encrypted data set 210. In certain embodiments, the one or more data analysis systems and models 212 may generate as output the homomorphically-encrypted recommendation of an identified interaction for the user 102.

In certain embodiments, the encrypted data operations system 208 may then provide the generated homomorphically-encrypted recommendation of an identified interaction for the user 102 to a computing system 214 associated with the second entity. For example, in certain embodiments, the computing system 214 associated with the second entity may decrypt the generated homomorphically-encrypted recommendation of an identified interaction for the user 102 and generate a decrypted data analysis output 216. In certain embodiments, the computing system 214 associated with the second entity may then provide the decrypted data analysis output 216 to the computing system 206 associated with the first entity. In certain embodiments, upon receiving the decrypted data analysis output 216, the computing system 206 associated with the first entity may then retrieve, from the first database associated with the first entity, contextual data associated with the first user data set 202, and then update the decrypted data analysis output 216 (e.g., decrypted recommendation of the identified interaction for the user 102) based on the retrieved contextual data associated with the first user data set 202.

In certain embodiments, the computing system 206 associated with the first entity may then provide the updated decrypted data analysis output 216 (e.g., decrypted recommendation of the identified interaction for the user 102 along with the retrieved contextual data) to one or more computing devices 220 that may be associated with the user 102. For example, in one embodiment, the updated decrypted data analysis output 216 (e.g., decrypted recommendation of the identified interaction for the user 102 along with the retrieved contextual data) may be provided to the one or more computing devices 220 that may be associated with the user 102 to prompt or influence the user 102 to perform the identified interaction for the user 102 with respect to the first entity, the second entity, or both.

Figure 3:
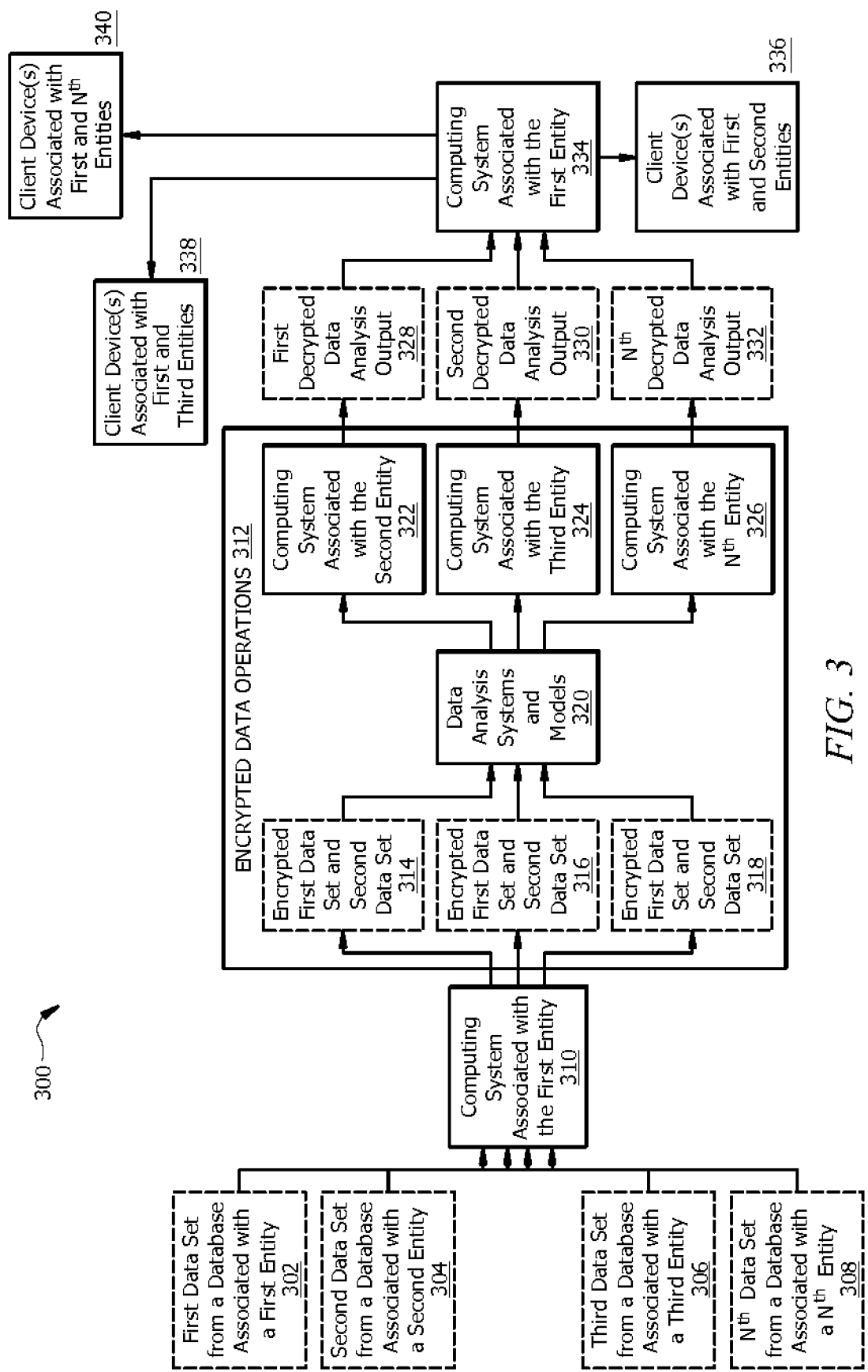
FIG. 3 illustrates a second embodiment of a workflow diagram for securely synchronizing and integrating data stored in databases associated with multiple entities, in accordance with certain aspects of the present disclosure.

FIG. 3 illustrates a second embodiment of a workflow diagram 300 for securely synchronizing and integrating data stored in databases associated with multiple entities, in accordance with one or more embodiments of the present disclosure. It should be appreciated that the workflow diagram 300 illustrates an embodiment in which the user 102 is associated with a first entity (e.g., the first entity is associated with the first computing system 140), a second entity (e.g., the second entity is associated with the second computing system 120), and any N number of entities each associated with a respective computing system and database.

In certain embodiments, as depicted by FIG. 3, the workflow diagram 300 may begin with a computing system 310 associated with a first entity accessing a first user data set 302, which may be sourced from a first database associated with the first entity, and further accessing a second user data set 304, which may be sourced from a second database associated with a second entity. In certain embodiments, as further depicted by FIG. 3. the computing system 310 associated with the first entity may also access a third user data set 306, which may be sourced from a third database associated with the third entity, and further accessing an Nth user data set 308, which may be sourced from an Nth database associated with an Nth entity in accordance with the presently disclosed embodiments. It should further be appreciated that while the operations with respect to the second user data set 304, the third user data set 306, and the Nth user data set 308 may be discussed in conjunction, during runtime, the disclosed operations with respect to the second user data set 304, the third user data set 306, and the Nth user data set 308 may be performed serially, in parallel, concurrently, at different times, or in some combination thereof.

For example, in certain embodiments, prior to accessing the second user data set 304, the third user data set 306, and the Nth user data set 308, the computing system 310 associated with the first entity may generate and provide respective API requests to the second database associated with the second entity for the second user data set 304, the third database associated with the third entity for the second user data set 306, and the $N^{th}$ database associated with the $N^{th}$ entity for the $N^{th}$ user data set 308. In certain embodiments, the computing system 310 associated with the first entity may then receive the second user data set 304, the third user data set 306, and the $N^{th}$ user data set 308 in response to the respective API requests. In one embodiment, the second user data set 304, the third user data set 306, and the $N^{th}$ user data set 308 may each be received by the computing system 310 associated with the first entity as respective homomorphically-encrypted data sets.

In certain embodiments, the second entity, the third entity, and the $N^{th}$ entity may each be separate from the first entity. In certain embodiments, the first entity may include, for example, a web-based service including a user profile for the user 102 and utilized to service and facilitate various user interactions between only the user 102 and the first entity. In certain embodiments, the second entity, the third entity, and the $N^{th}$ entity may each include, for example, a web-based service including respective user profiles for the user 102 and utilized to service and facilitate user interactions between the user and a number of other users associated with the second entity. For example, in one embodiment, the second entity, the third entity, and the $N^{th}$ entity may each be associated with a different type of web-based service.

In certain embodiments, as further depicted by FIG. 3, the workflow diagram 300 may continue with the computing system 310 associated with the first entity generating a homomorphically-encrypted data set 314 based on the first user data set 302 and the second user data set 304, a homomorphically-encrypted data set 316 based on the first user data set 302 and the third user data set 306, and a homomorphically-encrypted data set 318 based on the first user data set 302 and the $N^{th}$ user data set 308. In some embodiments, the computing system 310 associated with the first entity may generate the respective homomorphically-encrypted data sets 314, 316, and 318 and perform one or more operations utilizing the respective homomorphically-encrypted data sets 314, 316, and 318. That is, although illustrated as separate systems, in one embodiment, the computing system 310 associated with the first entity may include an encrypted data operations system 312 integrated as part of the computing system 310 associated with the first entity or as a peripheral system associated with the computing system 310 associated with the first entity.

In other embodiments, the computing system 310 associated with the first entity may generate and provide the respective homomorphically-encrypted data sets 314, 316, and 318 to the encrypted data operations system 312, which may be at least partially separate from the computing system 310 associated with the first entity, a computing system 322 associated with the second entity, a computing system 324 associated with the third entity, and a computing system 326 associated with the $N^{th}$ entity. In certain embodiments, the encrypted data operations system 312 may include one or more servers (e.g., including processors configured to process and operate on any homomorphically-encrypted data) that may be predetermined by the first entity, the second entity, the third entity, and the $N^{th}$ entity to operate on the respective homomorphically-encrypted data sets 314, 316, and 318.

In certain embodiments, as further depicted by FIG. 3, the workflow diagram 300 may continue with the encrypted data operations system 312 inputting the respective homomorphically-encrypted data sets 314, 316, and 318 into one or more data analysis systems and models 320. For example, in certain embodiments, the one or more data analysis systems and models 320 may include any of various predictive models including, for example, one or more of a univariate logistic regression model, a multivariate logistic regression model, a random forest model, a Naïve Bayes model, a gradient boosting model, an NN model, a statistical model, or other predictive model that may be trained to generate as outputs respective homomorphically-encrypted recommendations of identified interactions for the user 102 based on the respective homomorphically-encrypted data sets 314, 316, and 318. In certain embodiments, the one or more data analysis systems and models 320 may generate as outputs respective homomorphically-encrypted recommendations of identified interactions for the user 102.

In certain embodiments, the encrypted data operations system 312 may then provide the respective generated homomorphically-encrypted recommendations of identified interactions for the user 102 to the computing system 322 associated with the second entity, the computing system 324 associated with the third entity, and the computing system 326 associated with the $N^{th}$ entity. For example, in certain embodiments, the computing system 322 associated with the second entity may decrypt a first generated homomorphically-encrypted recommendation of an identified interaction for the user 102 and generate a first decrypted data analysis output 328, the computing system 324 associated with the third entity may decrypt a second generated homomorphically-encrypted recommendation of an identified interaction for the user 102 and generate a second decrypted data analysis output 330, and the computing system 326 associated with the $N^{th}$ entity may decrypt a third generated homomorphically-encrypted recommendation of an identified interaction for the user 102 and generate a third decrypted data analysis output 332.

In certain embodiments, the computing system 322 associated with the second entity, the computing system 324 associated with the third entity, and the computing system 326 associated with the $N^{th}$ entity may each then provide the first decrypted data analysis output 328, the first decrypted data analysis output 328, and the first decrypted data analysis output 328, respectively, to the computing system 310 associated with the first entity. In certain embodiments, upon receiving the first decrypted data analysis output 328, the first decrypted data analysis output 328, and the first decrypted data analysis output 328, the computing system 326 associated with the first entity may then retrieve, from the first database associated with the first entity, contextual data associated with the first user data set 302, and then update the first decrypted data analysis output 328, the first decrypted data analysis output 328, and the first decrypted data analysis output 328 based on the retrieved contextual data associated with the first user data set 302.

In certain embodiments, the computing system 310 associated with the first entity may then provide the respective updated decrypted data analysis outputs 328, 330, and 332 (e.g., respective decrypted recommendations of the identified interactions for the user 102 along with the retrieved contextual data) to one or more computing devices 336 that may be associated with the user 102 and/or the second entity, one or more computing devices 338 that may be associated with the user 102 and/or the third entity, and one or more computing devices 340 that may be associated with the user 102 and/or the $N^{th}$ entity. For example, in one embodiment, the respective updated decrypted data analysis outputs 328, 330, and 332 (e.g., respective decrypted recommendations of the identified interactions for the user 102 along with the retrieved contextual data) may be provided to the respective one or more computing devices 336, 338, and 340 to prompt or influence the user 102 to perform the identified interaction for the user 102 with respect to one or more of the second entity, the third entity, or the $N^{th}$ entity.

Figure 4:
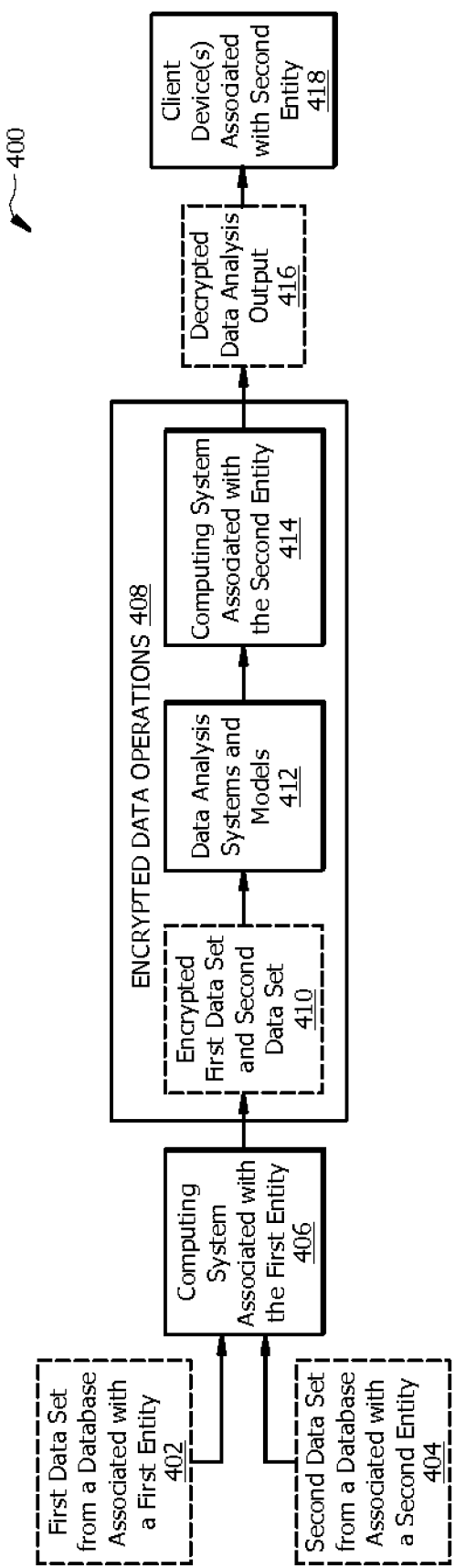
FIG. 4 illustrates a third embodiment of a workflow diagram for securely synchronizing and integrating data stored in databases associated with multiple entities, in accordance with certain aspects of the present disclosure.

FIG. 4 illustrates a third embodiment of a workflow diagram 400 for securely synchronizing and integrating data stored in databases associated with multiple entities, in accordance with one or more embodiments of the present disclosure. It should be appreciated that the workflow diagram 400 illustrates an embodiment in which the user 102 is associated with only a second entity (e.g., the second entity is associated with the second computing system 120). In certain embodiments, as depicted by FIG. 4, the workflow diagram 400 may begin with a computing system 406 associated with a first entity accessing a first user data set 402, which may be sourced from a first database associated with the first entity, and further accessing a second user data set 404, which may be sourced from a second database associated with a second entity.

For example, in certain embodiments, the computing system 406 associated with the first entity may, prior to accessing the second user data set 404, generate and provide an API request to the second database associated with the second entity for the second user data set 404, and receive, from the second database associated with the second entity, the second user data set 404 in response to the API request. In one embodiment, the second user data set 404 may be received by the computing system 406 associated with the first entity as a homomorphically-encrypted data set.

For example, in one embodiment, the second entity may be separate from the first entity, and the user 102, for example, may be associated with only the second entity. In certain embodiments, the first entity may include, for example, a web-based service utilized to service and facilitate various user interactions, but the user 102 may not have a first user profile established with the first entity. In certain embodiments, the second entity may include, for example, a web-based service including a second user profile for the user 102 and utilized to service and facilitate user interactions between the user and a number of other users associated with the second entity.

In certain embodiments, as further depicted by FIG. 4, the workflow diagram 400 may continue with the computing system 406 associated with the first entity generating a homomorphically-encrypted data set 410 based on the first user data set 402 and the second user data set 404. In one embodiment, the computing system 406 associated with the first entity may generate the homomorphically-encrypted data set 410 and perform one or more operations utilizing the homomorphically-encrypted data set 410. That is, although illustrated as separate systems, in one embodiment, the computing system 406 associated with the first entity may include an encrypted data operations system 408 integrated as part of the computing system 406 associated with the first entity or as a peripheral system associated with the computing system 406 associated with the first entity.

In another embodiment, the computing system 406 associated with the first entity may generate and provide the homomorphically-encrypted data set 410 to the encrypted data operations system 408, which may be at least partially separate from the computing system 406 associated with the first entity and a computing system 414 associated with the second entity. In certain embodiments, the encrypted data operations system 408 may include one or more servers (e.g., including processors configured to process and operate on any homomorphically-encrypted data) that may be predetermined by the first entity and the second entity to operate on the homomorphically-encrypted data set 410.

In certain embodiments, as further depicted by FIG. 4, the workflow diagram 200 may continue with the encrypted data operations system 408 inputting the homomorphically-encrypted data set 410 into one or more data analysis systems and models 412. For example, in certain embodiments, the one or more data analysis systems and models 412 may include any of various predictive models including, for example, one or more of a univariate logistic regression model, a multivariate logistic regression model, a random forest model, a Naïve Bayes model, a gradient boosting model, an NN model, a statistical model, or other predictive model that may be trained to generate as an output a homomorphically-encrypted recommendation of an identified interaction for the user 102 based on the homomorphically-encrypted data set 410. In certain embodiments, the one or more data analysis systems and models 412 may generate as output the homomorphically-encrypted recommendation of an identified interaction for the user 102.

In certain embodiments, the encrypted data operations system 408 by way of the computing system 406 associated with the first entity may then provide the generated homomorphically-encrypted recommendation of an identified interaction for the user 102 along with a set of instructions to a computing system 414 associated with the second entity. For example, in certain embodiments, the encrypted data operations system 408 by way of the computing system 406 associated with the first entity may provide the generated homomorphically-encrypted recommendation of an identified interaction for the user 102 along with the set of instructions to cause computing system 414 associated with the second entity to decrypt the generated homomorphically-encrypted recommendation of an identified interaction for the user 102 and generate a decrypted data analysis output 416.

In certain embodiments, the instructions may further cause the computing system 414 associated with the second entity to provide the decrypted data analysis output 416 (e.g., decrypted recommendation of the identified interaction for the user 102) to one or more computing devices 418 that may be associated with the user 102. For example, in one embodiment, the decrypted data analysis output 416 (e.g., decrypted recommendation of the identified interaction for the user 102) may be provided to the one or more computing devices 418 that may be associated with the user 102 to prompt or influence the user 102 to perform the identified interaction for the user 102 with respect to the first entity. For example, in one embodiment, the user 102 may be prompted or influenced to instantiate a first user profile with the first entity.

Figure 5:
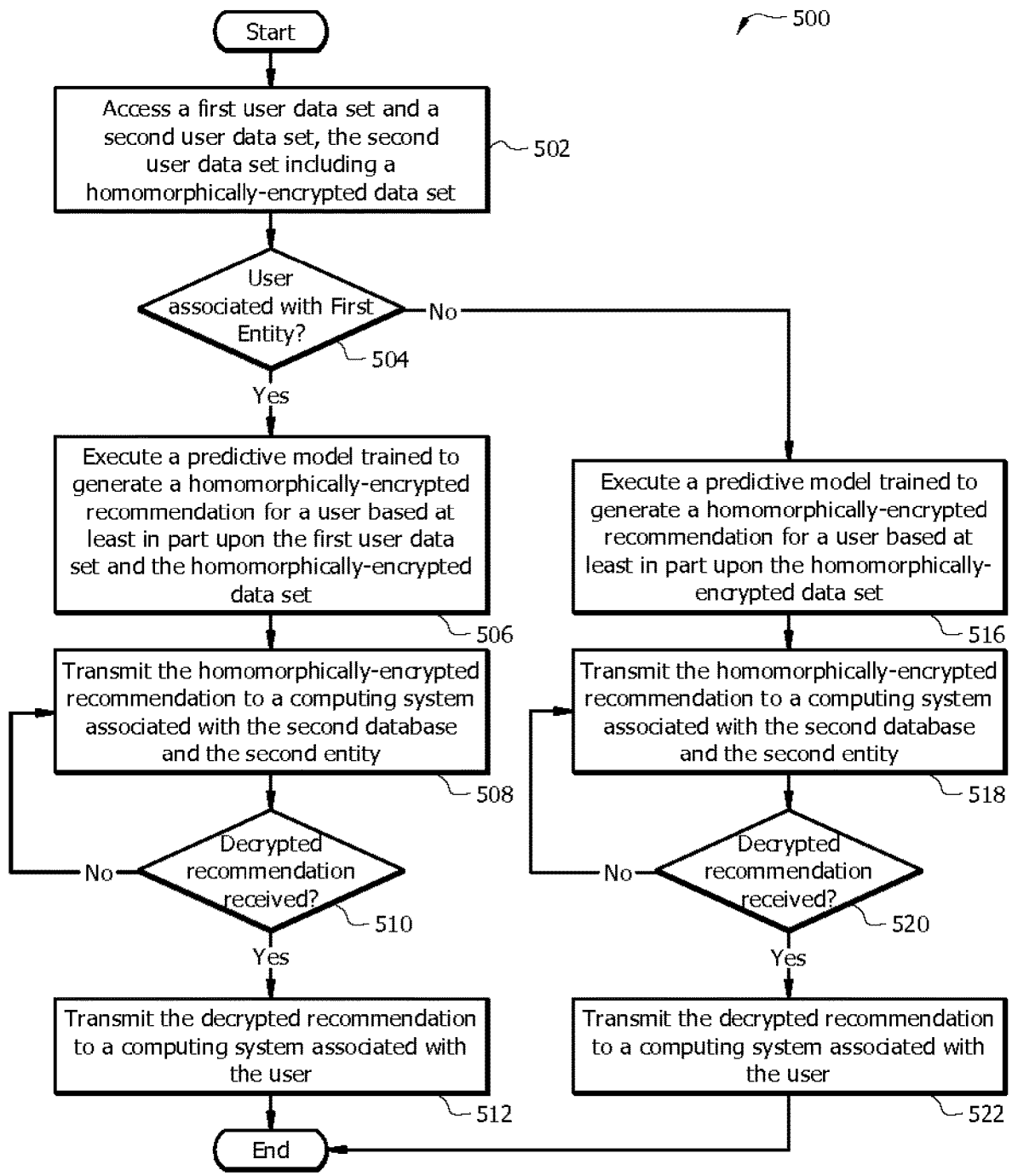
FIG. 5 illustrates a flowchart of an example method for securely synchronizing and integrating data stored in databases associated with multiple entities, in accordance with one or more embodiments of the present disclosure.

FIG. 5 illustrates a flowchart of an example method 500 for securely synchronizing and integrating data stored in databases associated with multiple entities, in accordance with one or more embodiments of the present disclosure. The method 500 may be performed by the system and network 100 as described above with respect to FIG. 1. The method 500 may begin at block 502 with the first computing system 140 accessing a first user data set and a second user data set. In one embodiment, the second user data set may include a homomorphically-encrypted data set. In certain embodiments, the first user data set may be sourced from a first database associated with a first entity and the second user data set may be sourced from a second database associated with a second entity.

In certain embodiments, the method 500 may continue at decision 504 with the first computing system 140 determining whether the user 102 is associated with the first entity. In response to determining that the user 102 is associated with the first entity, the method 500 may continue at block 506 with the first computing system 140 executing a predictive model trained to generate a homomorphically-encrypted recommendation of an identified interaction for the user 102 based at least in part upon the first user data set and the homomorphically-encrypted data set. In certain embodiments, the method 500 may continue at block 508 with the first computing system 140 transmitting the homomorphically-encrypted recommendation of the identified interaction for the user 102 to a computing system associated with the second database and the second entity.

In certain embodiments, the method 500 may continue at decision 510 with the first computing system 140 determining whether a decrypted recommendation of the identified interaction for the user 102 has been received from the computing system associated with the second database and the second entity. In certain embodiments, in response to determining that the decrypted recommendation of the identified interaction for the user 102 has been received from the computing system associated with the second database and the second entity, the method 500 may conclude at block 512 with the first computing system 140 transmitting the decrypted recommendation of the identified interaction for the user 102 to a computing system associated with the user 102.

In certain embodiments, returning to the decision 504, in response to determining that the user 102 is not associated with the first entity, the method 500 may continue at block 516 with the first computing system 140 executing the predictive model to generate a homomorphically-encrypted recommendation of an identified interaction for the user 102 based at least in part upon the second homomorphically-encrypted data set. In certain embodiments, the method 500 may continue at block 518 with the first computing system 140 transmitting the homomorphically-encrypted recommendation of the identified interaction for the user 102 to a computing system associated with the second database and the second entity.

In certain embodiments, the method 500 may then continue at decision 520 with the first computing system 140 determining whether a decrypted recommendation of the identified interaction for the user 102 has been received from the computing system associated with the second database and the second entity. In certain embodiments, in response to determining that the decrypted recommendation of the identified interaction for the user 102 has been received from the computing system associated with the second database and the second entity, the method 500 may conclude at block 522 transmitting the second decrypted recommendation of the identified interaction for the user 102 to the computing system associated with the user 102.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system, comprising:
a memory configured to store a first user data set sourced from a first database associated with a first entity and a second user data set sourced from a second database associated with a second entity, the second entity being separate from the first entity; and
one or more processors operably coupled to the memory and configured to:
access the first user data set and the second user data set, wherein the second user data set comprises a homomorphically-encrypted data set;
execute a predictive model trained to generate a homomorphically-encrypted recommendation of an identified interaction for a user based at least in part upon the first user data set and the homomorphically-encrypted data set, wherein the user is associated with at least one of the first entity or the second entity;
transmit the homomorphically-encrypted recommendation of the identified interaction for the user to a computing system associated with the second database and the second entity;
receive, from the computing system associated with the second database and the second entity, a decrypted recommendation of the identified interaction for the user; and
transmit the decrypted recommendation of the identified interaction for the user to a computing system associated with the user.

2. The system of claim 1, wherein the first entity comprises a first user profile configured to facilitate user interactions between only the user and the first entity, and wherein the second entity comprises a second user profile configured to facilitate user interactions between the user and a plurality of other users associated with the second entity.

3. The system of claim 1, wherein the one or more processors are further configured to:
prior to transmitting the decrypted recommendation of the identified interaction for the user to the computing system associated with the user:
retrieve, from the first database associated with the first entity, contextual data associated with the first user data set; and
update the decrypted recommendation of the identified interaction for the user based on the retrieved contextual data associated with the first user data set.

4. The system of claim 1, wherein the one or more processors are further configured to:
prior to accessing the second user data set:
generate and provide an application programming interface (API) request to the second database associated with the second entity for the second user data; and
receive, from the second database associated with the second entity, the second user data set in response to the API request, wherein the second user data set is received as the homomorphically-encrypted data set.

5. The system of claim 1, wherein the one or more processors are further configured to:
access a third user data set sourced from a third database associated with a third entity, wherein the third user data set comprises a second homomorphically-encrypted data set, and wherein the third entity is separate from the first entity and the second entity;
execute the predictive model to generate a second homomorphically-encrypted recommendation of an identified interaction for the user based at least in part upon the first user data set and the second homomorphically-encrypted data set;
transmit the second homomorphically-encrypted recommendation of the identified interaction for the user to a computing system associated with the third database and the third entity;
receive, from the computing system associated with the third database and the third entity, a second decrypted recommendation of the identified interaction for the user; and
transmit the second decrypted recommendation of the identified interaction for the user to the computing system associated with the user.

6. The system of claim 5, wherein the one or more processors are further configured to:
prior to transmitting the second decrypted recommendation of the identified interaction for the user to the computing system associated with the user:
retrieve, from the first database associated with the first entity, contextual data associated with the first user data set; and
update the second decrypted recommendation of the identified interaction for the user based on the retrieved contextual data associated with the first user data set.

7. The system of claim 1, wherein the user is associated with only the second entity, and wherein the one or more processors are further configured to:
generate and provide an application programming interface (API) request to the second database associated with the second entity for the second user data;

receive, from the second database associated with the second entity, the second user data set in response to the API request, wherein the second user data set is received as the homomorphically-encrypted data set; and execute the predictive model to generate a second homomorphically-encrypted recommendation of an identified interaction for the user based at least in part upon the homomorphically-encrypted data set.

8. The system of claim 7, wherein the one or more processors are further configured to transmit the second homomorphically-encrypted recommendation of the identified interaction for the user and a set of instructions to the computing system associated with the second database and the second entity, wherein the set of instructions comprises instructions to cause the computing system associated with the second database and the second entity to: 1) decrypt the second homomorphically-encrypted recommendation of the identified interaction for the user to generate a second decrypted recommendation of the identified interaction for the user and 2) transmit the second decrypted recommendation of the identified interaction for the user to the computing system associated with the user.

9. The system of claim 1, wherein the predictive model comprises one or more of a univariate logistic regression model, a multivariate logistic regression model, a random forest model, a Naïve Bayes model, a gradient boosting model, a neural network (NN) model, or a statistical model.

10. A method, comprising:
accessing a first user data set and a second user data set, wherein the second user data set comprises a homomorphically-encrypted data set, and wherein the first user data set is sourced from a first database associated with a first entity and the second user data set is sourced from a second database associated with a second entity, the second entity being separate from the first entity;
executing a predictive model trained to generate a homomorphically-encrypted recommendation of an identified interaction for a user based at least in part upon the first user data set and the homomorphically-encrypted data set, wherein the user is associated with at least one of the first entity or the second entity;
transmitting the homomorphically-encrypted recommendation of the identified interaction for the user to a computing system associated with the second database and the second entity;
receiving, from the computing system associated with the second database and the second entity, a decrypted recommendation of the identified interaction for the user; and
transmitting the decrypted recommendation to a computing system associated with the user.

11. The method of claim 10, wherein the first entity comprises a first user profile configured to facilitate user interactions between only the user and the first entity, and wherein the second entity comprises a second user profile configured to facilitate user interactions between the user and a plurality of other users associated with the second entity.

12. The method of claim 10, further comprising:
prior to transmitting the decrypted recommendation of the identified interaction for the user to the computing system associated with the user:
retrieving, from the first database associated with the first entity, contextual data associated with the first user data set; and
updating the decrypted recommendation of the identified interaction for the user based on the retrieved contextual data associated with the first user data set.

13. The method of claim 10, further comprising:
prior to accessing the second user data set:
generating and provide an application programming interface (API) request to the second database associated with the second entity for the second user data; and
receiving, from the second database associated with the second entity, the second user data set in response to the API request, wherein the second user data set is received as the homomorphically-encrypted data set.

14. The method of claim 10, further comprising:
accessing a third user data set sourced from a third database associated with a third entity, wherein the third user data set comprises a second homomorphically-encrypted data set, and wherein the third entity is separate from the first entity and the second entity;
executing the predictive model to generate a second homomorphically-encrypted recommendation of an identified interaction for the user based at least in part upon the first user data set and the second homomorphically-encrypted data set;
transmitting the second homomorphically-encrypted recommendation of the identified interaction for the user to a computing system associated with the third database and the third entity;
receiving, from the computing system associated with the third database and the third entity, a second decrypted recommendation of the identified interaction for the user; and
transmitting the second decrypted recommendation of the identified interaction for the user to the computing system associated with the user.

15. The method of claim 14, further comprising:
prior to transmitting the second decrypted recommendation of the identified interaction for the user to the computing system associated with the user:
retrieving, from the first database associated with the first entity, contextual data associated with the first user data set; and
updating the second decrypted recommendation of the identified interaction for the user based on the retrieved contextual data associated with the first user data set.

16. The method of claim 10, wherein the user is associated with only the second entity, the method further comprising:
generating and provide an application programming interface (API) request to the second database associated with the second entity for the second user data;
receiving, from the second database associated with the second entity, the second user data set in response to the API request, wherein the second user data set is received as the homomorphically-encrypted data set; and
executing the predictive model to generate a second homomorphically-encrypted recommendation of an identified interaction for the user based at least in part upon the homomorphically-encrypted data set.

17. The method of claim 16, further comprising:
transmitting the second homomorphically-encrypted recommendation of the identified interaction for the user and a set of instructions to the computing system associated with the second database and the second entity, wherein the set of instructions comprises instructions to cause the computing system associated with the second database and the second entity to: 1) decrypt the second homomorphically-encrypted recommendation of the identified interaction for the user to generate a second decrypted recommendation of the identified interaction for the user and 2) transmit the second decrypted recommendation of the identified interaction for the user to the computing system associated with the user.

18. The method of claim 10, wherein the predictive model comprises one or more of a univariate logistic regression model, a multivariate logistic regression model, a random forest model, a Naïve Bayes model, a gradient boosting model, a neural network (NN) model, or a statistical model.

19. A non-transitory computer-readable medium storing instructions that, when executed by one or more processors, cause the one or more processors to:
  access a first user data set and a second user data set, wherein the second user data set comprises a homomorphically-encrypted data set, and wherein the first user data set is sourced from a first database associated with a first entity and the second user data set is sourced from a second database associated with a second entity, the second entity being separate from the first entity;
  execute a predictive model trained to generate a homomorphically-encrypted recommendation of an identified interaction for a user based at least in part upon the first user data set and the homomorphically-encrypted data set, wherein the user is associated with at least one of the first entity or the second entity;
  transmit the homomorphically-encrypted recommendation of the identified interaction for the user to a computing system associated with the second database and the second entity;
  receive, from the computing system associated with the second database and the second entity, a decrypted recommendation of the identified interaction for the user; and
  transmit the decrypted recommendation to a computing system associated with the user.

20. The non-transitory computer-readable medium of claim 19, wherein the first entity comprises a first user profile configured to facilitate user interactions between only the user and the first entity, and wherein the second entity comprises a second user profile configured to facilitate user interactions between the user and a plurality of other users associated with the second entity.

* * * * *